(12) United States Patent
Tanaka et al.

(10) Patent No.: US 12,721,268 B2
(45) Date of Patent: Sep. 1, 2026

(54) AUTONOMOUS TRAVEL METHOD, AUTONOMOUS TRAVEL SYSTEM, AND AUTONOMOUS TRAVEL PROGRAM

(71) Applicant: Yanmar Holdings Co., Ltd., Osaka (JP)

(72) Inventors: Taishi Tanaka, Okayama (JP); Yuji Yamaguchi, Okayama (JP); Masaaki Murayama, Okayama (JP); Masafumi Saito, Okayama (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 220 days.

(21) Appl. No.: 18/214,985

(22) Filed: Jun. 27, 2023

(65) Prior Publication Data

US 2023/0413727 A1 Dec. 28, 2023

(30) Foreign Application Priority Data

Jun. 28, 2022 (JP) ................................ 2022-103486

(51) Int. Cl.
*A01D 41/127* (2006.01)
*G05D 1/00* (2024.01)

(52) U.S. Cl.
CPC ....... *A01D 41/1278* (2013.01); *G05D 1/0223* (2013.01)

(58) Field of Classification Search
CPC .. A01D 41/1278; A01D 41/00; G05D 1/0223; A01B 69/008
See application file for complete search history.

(56) References Cited

U.S. PATENT DOCUMENTS

2010/0082215 A1* 4/2010 Miyajima ....... B60W 30/18009 701/93
2018/0345966 A1 12/2018 Aso
2019/0072972 A1* 3/2019 Shinkai ................ G05D 1/0217
2020/0339119 A1 10/2020 Ohmura et al.
2022/0167543 A1* 6/2022 Bast ....................... G05D 1/646
2023/0134855 A1* 5/2023 Hodel .................. E02F 9/2045 701/50

FOREIGN PATENT DOCUMENTS

JP 2006331000 A * 12/2006
JP 2021-083394 A 6/2021

OTHER PUBLICATIONS

Machine translation of JP-2006331000-A (Year: 2006).*
European Search Report dated Jan. 4, 2024 issued in EP Application No. 23178631.0.

* cited by examiner

*Primary Examiner* — Navid Z. Mehdizadeh
*Assistant Examiner* — Caitlin R McCleary
(74) *Attorney, Agent, or Firm* — NORTON ROSE FULBRIGHT US LLP

(57) ABSTRACT

On a straight advancing route in which a straight advancing vehicle speed is preset following a turning route in which a turning vehicle speed is preset, a traveling processor causes a combine to travel at a straight advancing vehicle speed if the distance of the straight advancing route is not less than a predetermined distance, and causes a combine to travel at a turning vehicle speed if the distance of the straight advancing route is less than the predetermined distance.

11 Claims, 10 Drawing Sheets

FIG. 2

AUTONOMOUS TRAVEL METHOD, AUTONOMOUS TRAVEL SYSTEM, AND AUTONOMOUS TRAVEL PROGRAM

CROSS-REFERENCE TO RELATED APPLICATIONS

This application claims priority under 35 U.S.C. § 119 to JP Application No. 2022-103486 filed Jun. 28, 2022 the entire contents of which are hereby incorporated by reference.

TECHNICAL FIELD

The present disclosure relates to an autonomous travel system, an autonomous travel method, and an autonomous travel program for causing a work vehicle to perform an autonomous travel.

BACKGROUND ART

Conventionally, a work vehicle, which travels autonomously in work areas such as fields along a target route preset based on position information of the work vehicle, is known (see e.g., Patent Document 1). For example, the work vehicle autonomously travels along a target route while controlling vehicle speed based on preset vehicle speed at forward traveling, backward traveling, and turning traveling (see, e.g., Patent Document 1).

PRIOR ART DOCUMENT

Patent Document

Patent Document 1: Japanese Patent Laid-open Publication No. 2021-083394

SUMMARY OF INVENTION

Technical Problem

Here, when a turning route is generated for an area where the work vehicle travels by turning (e.g., headland area), the turning route may include a straight advancing route with a short distance, for example. For example, in a turning area where a work vehicle makes a 180-degree turn, a straight advancing route with a short distance may be included between two substantially 90-degree turning routes. Generally, since a vehicle speed on the straight advancing route is set at a higher than that on the turning route, if the work vehicle travels such a route, acceleration and deceleration occur in a short time period before and after the straight advancing route. It results in problems such as unstable behavior of the work vehicle and poor riding comfort for the operator getting on the work vehicle.

An object of the present disclosure is to provide an autonomous travel method, an autonomous travel system, and an autonomous travel program capable of suppressing occurrence of unnecessary acceleration/deceleration when a work vehicle travels a plurality of routes on which vehicle speeds are preset differently.

Solution to Problem

An autonomous travel method according to the present disclosure includes: on a second route in a target route including a first route for which a first vehicle speed is preset and the second route following the first route for which a second vehicle speed different from the first vehicle speed is preset, causing a work vehicle to travel at the second vehicle speed if a distance of the second route is not less than a predetermined distance; and changing the second vehicle speed to cause the work vehicle to travel at the changed second vehicle speed if the distance of the second route is less than the predetermined distance.

An autonomous travel system according to the present disclosure includes a traveling processor, on a second route in a target route including a first route for which a first vehicle speed is preset and the second route following the first route for which a second vehicle speed different from the first vehicle speed is preset, to cause a work vehicle to travel at the second vehicle speed if a distance of the second route is not less than a predetermined distance, and to change the second vehicle speed to cause the work vehicle to travel at the changed second vehicle speed if the distance of the second route is less than the predetermined distance.

An autonomous travel program according to the present disclosure for causing one or more processors to execute the procedures includes: on a second route in a target route including a first route for which a first vehicle speed is preset and the second route following the first route for which a second vehicle speed different from the first vehicle speed is preset, causing a work vehicle to travel at the second vehicle speed if a distance of the second route is not less than a predetermined distance; and changing the second vehicle speed to cause the work vehicle to travel at the changed second vehicle speed if the distance of the second route is less than the predetermined distance.

Advantageous Effects of Invention

According to the present disclosure, it is possible to provide an autonomous travel method, an autonomous travel system, and an autonomous travel program capable of suppressing occurrence of unnecessary acceleration/deceleration when a work vehicle travels a plurality of routes on which vehicle speeds are preset differently.

BRIEF DESCRIPTION OF DRAWINGS

FIG. 2 is an external view illustrating a configuration of a combine according to the embodiment of the present disclosure.

DESCRIPTION OF EMBODIMENTS

Embodiments described below are specific examples embodying the present disclosure and are not intended to limit the technical scope of the present disclosure.

First Embodiment

Figure 1:
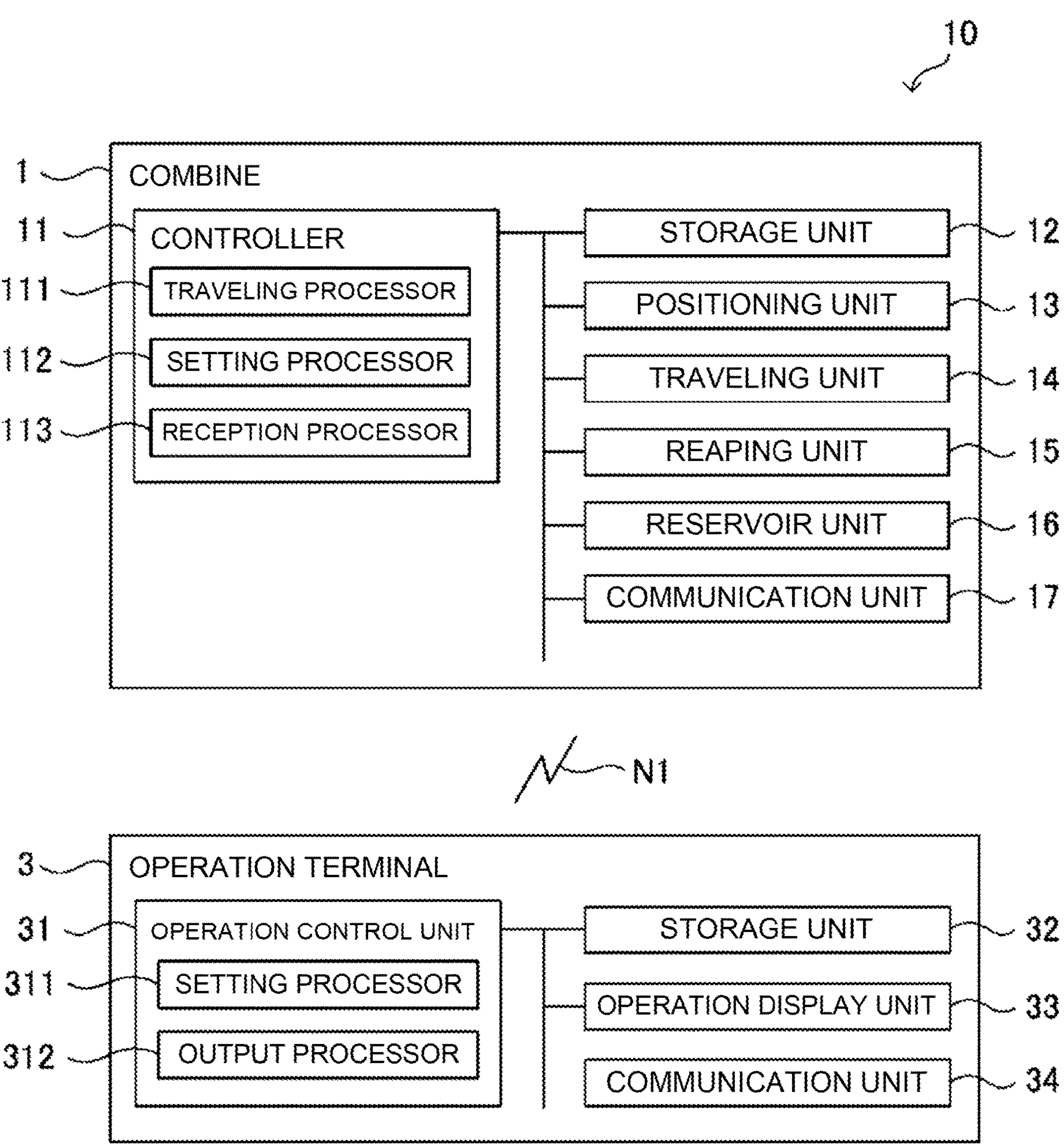
FIG. 1 is a block diagram illustrating a configuration of an autonomous travel system according to an embodiment of the present disclosure.

A combine 1 is described below as an example of a work vehicle of the present disclosure. As illustrated in FIG. 1, an autonomous travel system 10 according to the embodiment of the present disclosure includes the combine 1 and an operation terminal 3. The combine 1 and the operation terminal 3 can communicate with each other via a communication network N1. For example, the combine 1 and the operation terminal 3 can communicate via a mobile phone network, a packet network, or a wireless LAN.

The combine 1 is a work vehicle to perform agricultural work such as reaping in a field (an example of a work area). The combine 1 performs the work while traveling in the field. At the same time, the combine 1 sends to the operation terminal 3 GNSS (Global Navigation Satellite System) information of a GNSS antenna mounted on the combine 1, i.e., the combine 1's own vehicle position, as measurement point data.

The combine 1 is configured to be an autonomous travel vehicle that performs the autonomous travel along a preset work route. The combine 1 also receives various types of setting information from the operation terminal 3 to perform the autonomous travel according to the setting information.

The operation terminal 3 is a portable terminal capable of remotely controlling the combine 1, and is composed of a tablet type terminal, a laptop type personal computer, a smart phone, etc., for example. An operation device similar to the operation terminal 3 may be mounted on the combine 1.

A worker (operator) can perform setting operations for various setting items at the operation terminal 3. The operation terminal 3 also displays information such as a work state and traveling state of the combine 1 during autonomous travel. The operator can recognize the work state and traveling state at the operation terminal 3.

Figure 3:
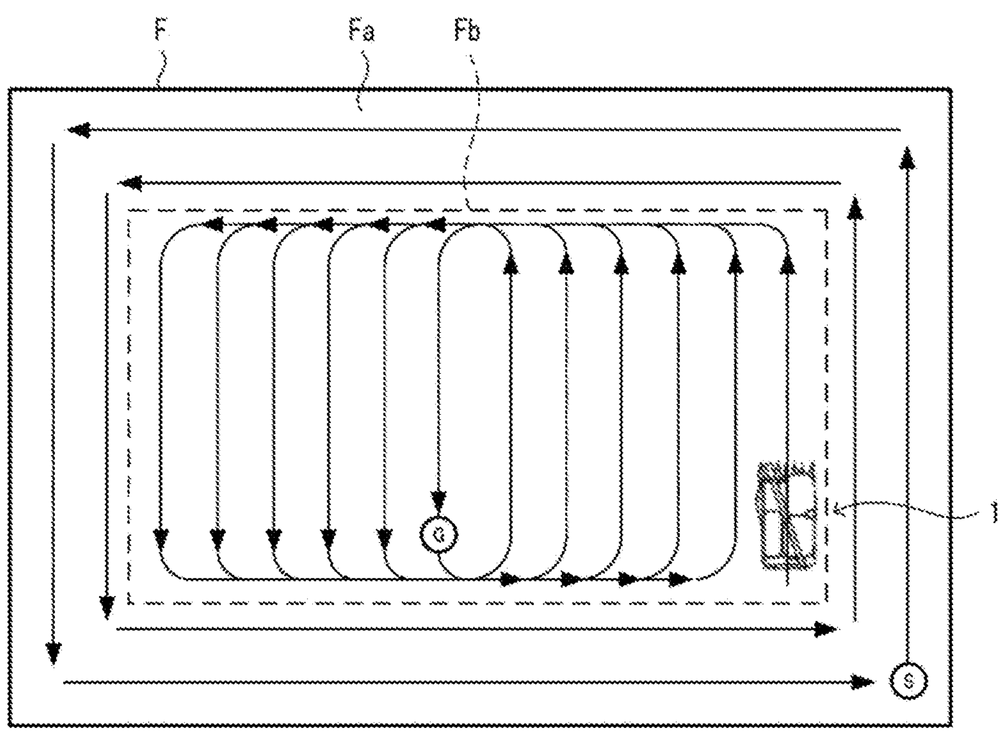
FIG. 3 is a diagram illustrating an example of a target route set in a field according to the embodiment of the present disclosure.

FIG. 3 shows an example of a target route generated for the field F. For example, the combine 1 performs reaping operation ("circumferential reaping") in the field F from a work start position S to a work end position G along the target route while traveling in a spiral manner from the outer circumference side to the inner circumference side. Specifically, in an outer circumferential area Fa on the outer circumferential side of the field F, the combine 1 performs reaping operation while traveling along the edge of the field (outer circumference). In the inner circumferential area Fb on the inner circumferential side of the field F, the combine 1 performs the reaping operation while traveling straight ahead in the up-down direction in FIG. 3 as viewed from the paper, and moves between work routes while traveling by turning and traveling straight ahead without performing the reaping operation in the left-right direction in FIG. 3 as viewed from the paper.

Figure 6:
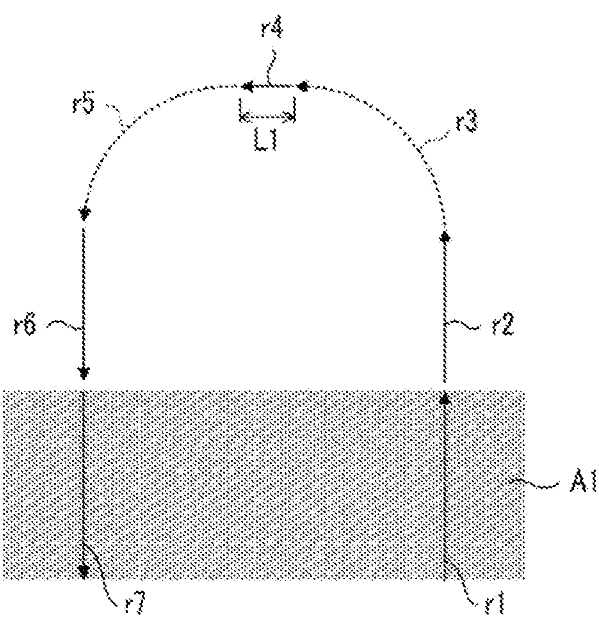
FIG. 6 is a diagram illustrating an example of a travel method of the combine on a target route according to the first embodiment of the present disclosure.

Here, for example, when a turning route is generated for the inner circumferential area Fb in which combine 1 travels by turning, the turning route may include a straight advancing route with a short distance. For example, in a turning area where combine 1 turns 180 degrees, there is a case where a straight advancing route with a short distance is included between two substantially 90-degree turning routes. FIG. 6 shows an example of a travel method of the combine 1 on the target route. The target routes shown in FIG. 6 include a straight advancing route r1 within a work area A1, a straight advancing route r2, a turning route r3, a straight advancing route r4, a turning route r5, and a straight advancing route r6 which are outside the work area A1 (e.g., headland area), and a straight advancing route r7 within the work area A1. In this way, in the turning area, a straight advancing route r4 with a short distance is included between the two turning routes r3 and r5.

Figure 5:
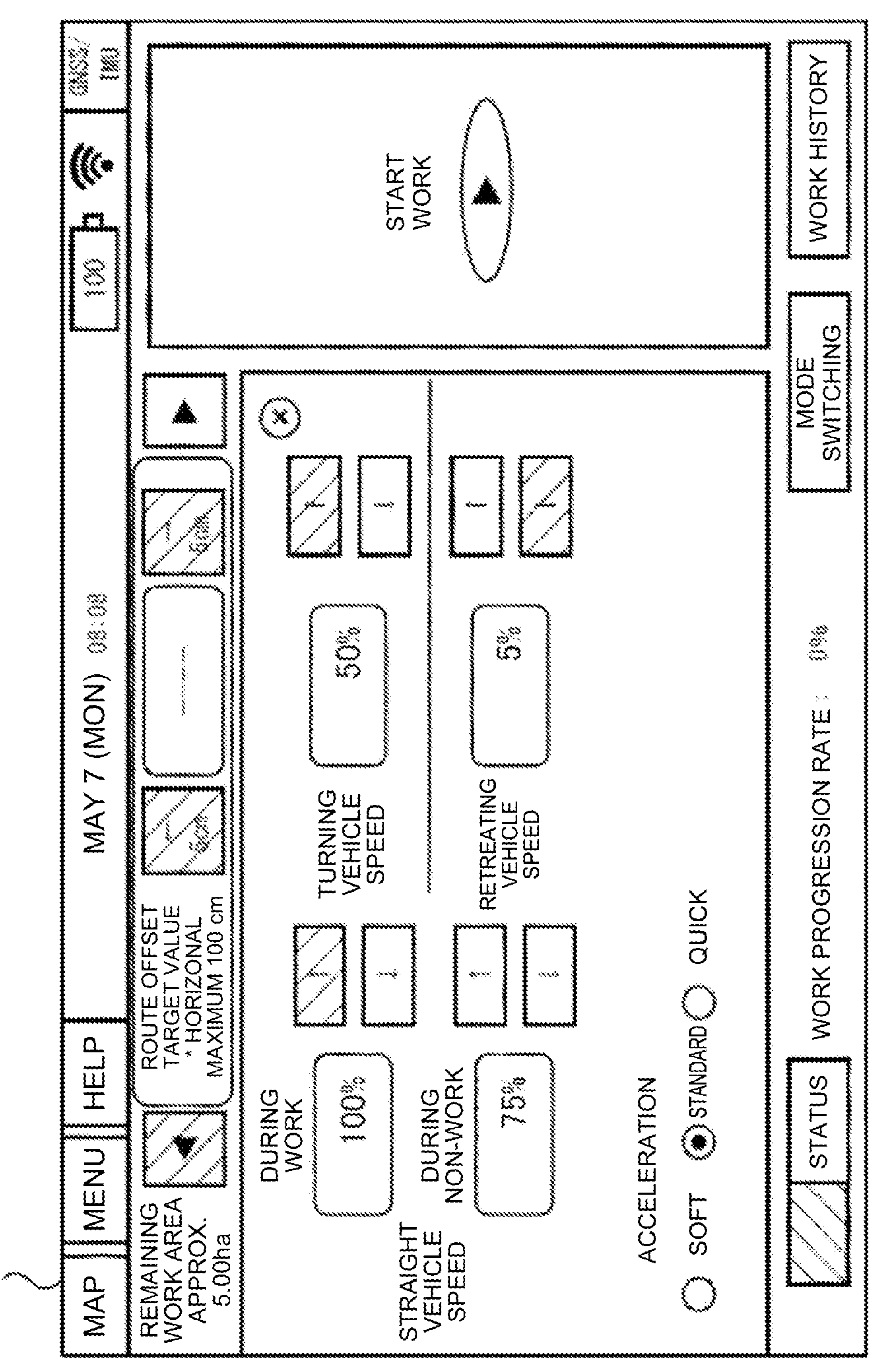
FIG. 5 is a diagram illustrating another example of the setting screen displayed in the operation terminal according to the embodiment of the present disclosure.

In the target route, a vehicle speed for straight-ahead travel (straight advancing vehicle speed) is preset for the straight advancing route, and a vehicle speed for turning travel (turning vehicle speed) is preset for the turning route (see FIG. 5). Generally, the straight advancing vehicle speed is set so as to be faster than the turning vehicle speed. In the target route shown in FIG. 6, the combine 1 travels along the straight advancing route r1 and the straight advancing route r2 at the straight advancing vehicle speed, travels along the turning route r3 at the turning vehicle speed, travels along the straight advancing route r4 at the straight advancing vehicle speed, travels along the turning route r5 at the turning vehicle speed, and travels along the straight advancing route r6 and the straight advancing route r7 at the straight advancing vehicle speed.

Here, for example, if the distance L1 of the straight advancing route r4 generated between the turning route r3 and the turning route r5 is short, the combine 1 accelerates after transiting from the turning route r3 to the straight advancing route r4 and decelerates on the turning route r5 immediately. Thus, acceleration and deceleration occur in a short time period before and after traveling along the straight advancing route r4, so that it results in problems such as unstable behavior of the work vehicle and poor riding comfort for the operator getting on the work vehicle.

In contrast, the autonomous travel system 10 of the preset embodiment has a configuration capable of suppressing the occurrence of unnecessary acceleration and deceleration when the combine 1 travels along a plurality of routes on which vehicle speeds are preset differently, as described below. In the following, a specific configuration of the combine 1 and the operation terminal 3 to realize the abovementioned configuration is described in detail.

Operation Terminal 3

As illustrated in FIG. 1, the operation terminal 3 is an information processing device that includes an operation control unit 31, a storage unit 32, an operation display unit 33, a communication unit 34, and the like. The operation terminal 3 consists of a tablet terminal, for example.

The communication unit 34 is a communication interface that connects the operation terminal 3 to the communication network N1 in a wired or wireless manner, and conducts data communication with an external device such as one or more combines 1 via the communication network N1 in accordance with a predetermined communication protocol.

The operation display unit 33 is a user interface that includes a display unit such as a liquid crystal display and an organic EL display that displays various pieces of information, and an operating unit such as a touch panel, a mouse, and a keyboard that accepts operations. The operator operates the operating unit on an operation screen displayed on the display unit, this makes it possible to execute operation to register the various pieces of information. Furthermore, the operator can operate the operating unit to provide an autonomous travel instruction for the combine 1. Furthermore, at a location away from the combine 1, the operator can recognize a travel state of the combine 1, which travels autonomously along the travel route in the field, from a travel trajectory that is displayed on the operation terminal 3.

The storage unit 32 is a non-volatile storage unit such as a hard disk drive (HDD) and a solid state drive (SSD) that store various pieces of information. The storage unit 32 stores a control program for causing the operation control unit 31 to execute a predetermined control process. For example, the control program is non-temporarily recorded in a computer-readable recording medium such as a flash ROM, an EEPROM, a CD or a DVD, read by a predetermined reading device (not shown) provided in the operation terminal 3, and stored in the storage unit 32. The control programs may be downloaded from a server (not illustrated) to the operation terminal 3 via the communication network N1 and be stored in the storage unit 32. The storage unit 32 may also store the work information transmitted from the combine 1.

In addition, a dedicated application for causing the combine 1 to autonomously travel is installed in the storage unit 32. The operation control unit 31 activates the dedicated application to execute a setting process of various types setting information about the combine 1, issue an autonomous travel instruction to the combine 1, or the like.

The operation control unit 31 has control devices such as a CPU, a ROM, and a RAM. The CPU is a processor that executes various types of arithmetic processes. The ROM is a non-volatile storage unit in which a control program such as a BIOS and an OS for causing the CPU to execute the various arithmetic processes are previously stored. The RAM is a volatile or non-volatile storage unit that stores various pieces of information and is used as a temporary storage memory for the various processes executed by the CPU. The operation control unit 31 controls the operation terminal 3 by causing the CPU to execute the various control programs previously stored in the ROM or the storage unit 32.

As illustrated in FIG. 1, the operation control unit 31 includes various processors such as a setting processor 311 and an output processor 312. The operation control unit 31 functions as the various processors by causing the CPU to execute the various processes according to the control programs. Some or all of the processors may be composed of an electronic circuit. The control programs may be programs for causing a plurality of processing units to function as the processors.

The setting processor 311 sets various pieces of setting information for causing the combine 1 to perform the autonomous travel. Specifically, the setting processor 311 sets field information about the field. The examples of the field information include the shape, size, and position information (coordinates and the like) of the farm field's outermost periphery, measurement point data constituting the farm field's outermost periphery, and the shape, size, and position information (coordinates and the like) of a work area in the field for performing the work in the field. The field information includes an address of the field, the registered name and date of the field information, and the registered name and date of the work area in the field. The setting processor 311 accepts registration operation of the field information by the operator to set the field information.

Figure 4:
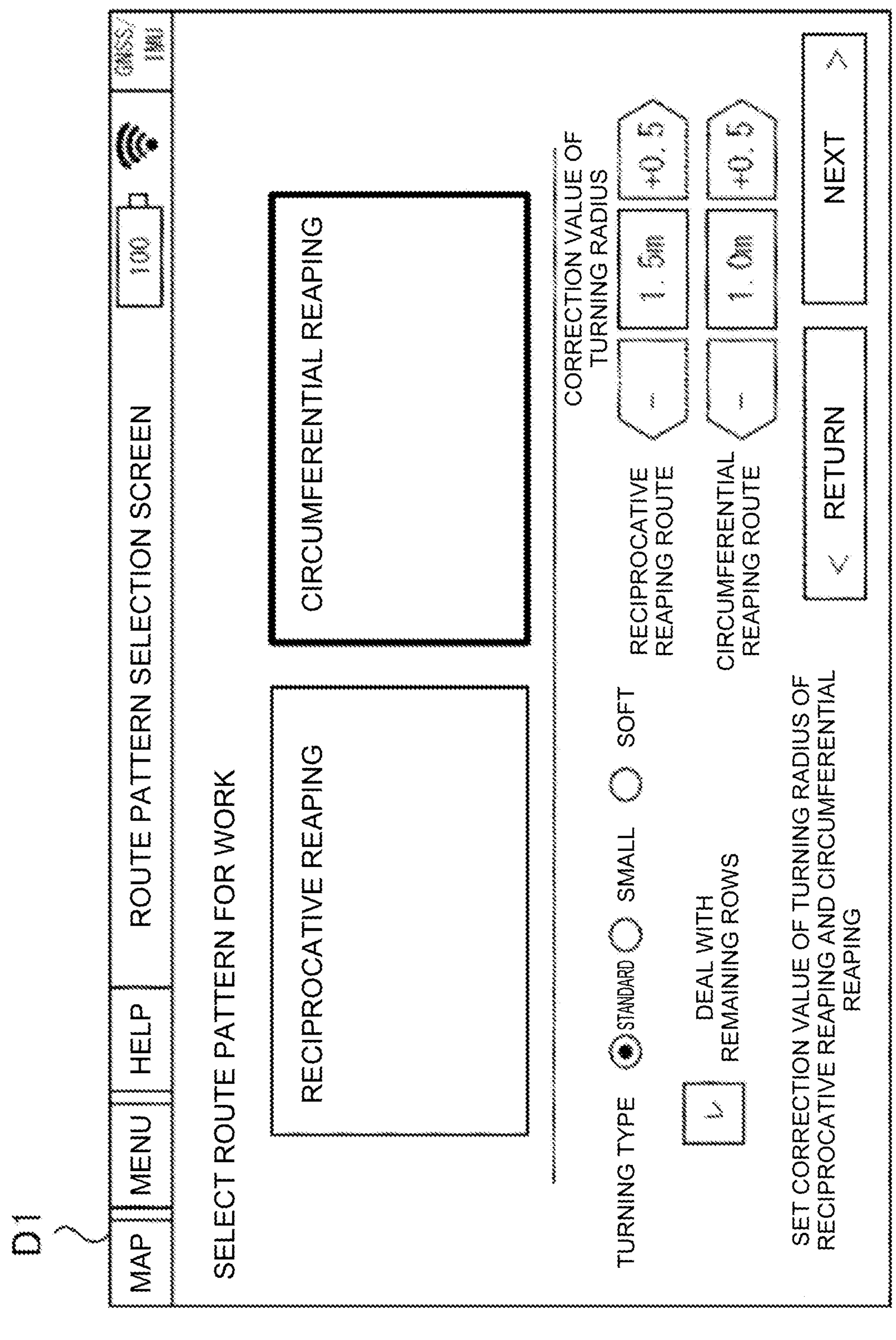
FIG. 4 is a diagram illustrating an example of a setting screen displayed in an operation terminal according to the embodiment of the present disclosure.

The setting processor 311 also creates the target route (work route). For example, the operator selects a route pattern, a turning type, etc. on the setting screen D1 shown in FIG. 4. The route pattern includes "reciprocative reaping" in which multiple rows are reaped backward and forward, and "circumferential reaping" in which a row along an inner circumference of the work area in the field is reaped while shifting the inner circumference to the center. The turning type include a "standard type" in which the minimum turning radius is a radius that the combine 1 can turn under a normal condition, a "small type" in which a turning radius is smaller than that of the standard type, and a "soft type" in which the turning radius is larger than that of the standard type and the minimum turning radius is a radius that the combine 1 can turn safely in an adverse condition (such as a muddy condition). The operator can also correct on the setting screen D1 the turning radius when turning on the target route for the reciprocative reaping or the circumferential reaping.

The setting processor 311 also creates the target route based on information, such as the field information, the route pattern, the turning type, and the turning radius. The setting processor 311 registers the created work route by associating with the field. The target route shown in FIG. 3 indicates the route corresponding to the route pattern of "circumferential reaping".

The setting processor 311 also sets a travel speed (vehicle speed) of the combine 1. For example, the operator can set the vehicle speed of the combine 1 on the setting screen D2 shown in FIG. 5. The setting screen D2 includes setting fields for setting a ratio of the vehicle speed during the autonomous travel to a set speed set with a main shift lever of the combine 1, an acceleration phase during the autonomous travel, and the like. The vehicle speed during the autonomous travel includes a straight vehicle speed, a turning vehicle speed, and a retreating vehicle speed during working or non-working condition. The operator can set the ratio of the vehicle speed to the set speed set with the main shift lever as a percentage on the setting screen D2. On the setting screen D2, the operator can select as acceleration during the autonomous travel any one of multiple levels, such as "soft", "standard", or "quick".

In addition to the information mentioned above, the setting processor 311 sets well-known information, such as the type of the combine 1 (maximum number of rows to be reaped), a vehicle width, and a vehicle length.

The output processor 312 outputs to the combine 1 various pieces of setting information set by the setting processor 311. Based on operation of the operator, the output processor 312 outputs a work start instruction and a work end instruction to the combine 1.

Upon the operation control unit 31 accepts the work start instruction from the operator, the output processor 312 outputs the work start instruction to the combine 1. Thereby, the controller 11 of the combine 1 obtains the work start instruction from the operation terminal 3. Upon obtaining the work start instruction, the controller 11 causes the combine 1 to start the work and traveling. Upon the operation control unit 31 accepts the work start instruction from the operator, the output processor 312 outputs the work stop instruction to the combine 1. Thereby, the controller 11 of the combine 1 obtains the work stop instruction from the operation terminal 3. Upon obtaining the work stop instruction, the controller 11 causes the combine 1 to stop the work and traveling.

The operation terminal 3 may be accessible to a Web site (an agricultural support site) of an agricultural support service provided by a server (not shown) via the communication network N1. In this case, the operation terminal 3 can function as an operation terminal for the server by a browser program being executed by the operation control unit 31. The server includes the processing units mentioned above to execute each of the processes.

Combine 1

Figure 2:
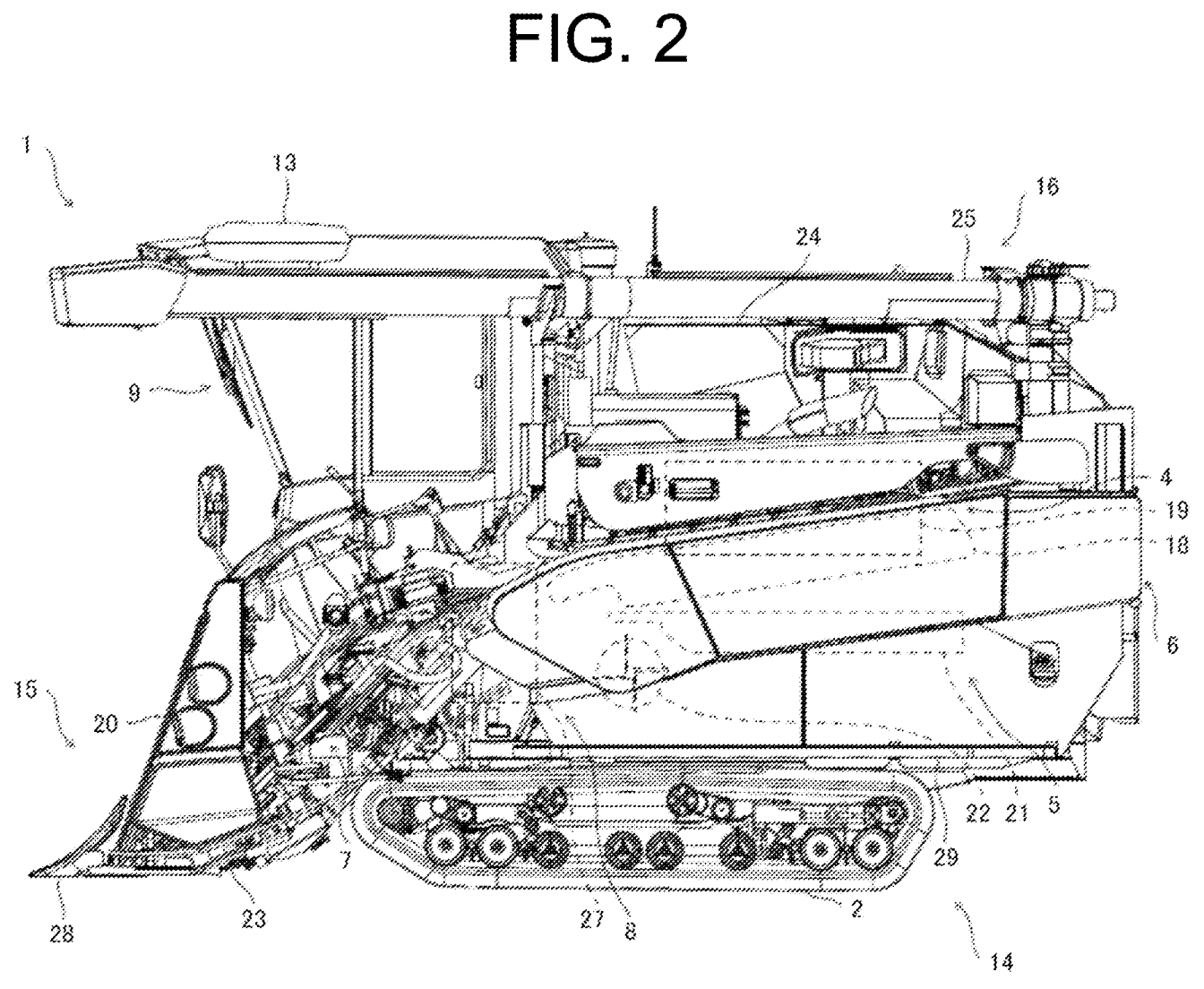

FIG. 2 is an external view illustrating the combine 1 as viewed from the side. As shown in FIGS. 1 and 2, the combine 1 is equipped with a threshing unit 4, a sorting unit 5, a waste straw processing unit 6, a power unit 8, a steering unit 9, a controller 11, a storage unit 12, a positioning unit 13, a traveling unit 14, a reaping unit 15, a reservoir unit 16, and a communication unit 17. The combine 1 is configured as a head-feeding type combine. While traveling by the traveling unit 14, the combine 1 reaps culms by the reaping unit 15, threshes them by the threshing unit 4, sorts grains by the sorting unit 5, and reserves them in the reservoir unit 16. The combine 1 processes a waste straw after threshing by a waste straw processing unit 6. By the power supplied by the power unit 8, the combine 1 drives the traveling unit 14, the reaping unit 15, the reservoir unit 16, the threshing unit 4, the sorting unit 5, and the waste straw processing unit 6.

The traveling unit 14 is provided below a machine body frame 29, and includes a pair of crawler-type traveling devices 2 on each side and a transmission (not shown). The traveling unit 14 causes the combine 1 to travel in a forward-and-backward direction or to turn to a left-and-right direction by rotating crawlers of a crawler-type traveling device 2 by power (e.g., rotation power) transmitted from an engine 27 of the power unit 8. The transmission transmits the power (rotation power) of the power unit 8 to the crawler-type traveling device 2 and can also change the speed of the rotation power.

The reaping unit 15 is provided in front of the traveling unit 14, and performs reaping work for rows within the reapable number of rows. The reaping unit 15 includes a divider 28, a raising device 20, a cutting device 23, and a conveying device 7. The divider 28 divides grain culms in the field for every row and guides to the raising device 20 a predetermined number of grain culms for rows within the reapable number of rows. The raising device 20 raises the grain culms that are guided by the divider 28. The cutting device 23 cuts the grain culms raised by the raising device 20. The conveying device 7 conveys the grain culms cut by the cutting device 23 to the threshing unit 4.

The threshing unit 4 is provided in the rear of the reaping unit 15. The threshing unit 4 includes a feed chain 18 and a threshing cylinder 19. The feed chain 18 conveys to the threshing unit for threshing the grain culms conveyed from the conveying device 7 of the reaping unit 15, and further conveys the threshed grain culms, that is, waste straws to the waste straw processing unit 6. The threshing cylinder 19 threshes the grain culms being conveyed by the feed chain 18.

The sorting unit 5 is provided below the threshing unit 4. The sorting unit 5 includes a swing sorting device 21, an air blow sorting device 22, a grain conveying device (not shown), and a waste straw discharge device (not shown). The swing sorting device 21 sifts the threshed grain that falls from the threshing unit 4 and sorts the threshed grains into grains, straw wastes, etc. The air blow sorting device 22 further sorts the threshed grains sorted by the swing sorting device 21 into grains, straw wastes, etc., by air blow. The grain conveying device conveys to the reservoir unit 16 grains sorted by the swing sorting device 21 and the air blow sorting device 22. The waste straw discharge device discharges to the outside of the machine the waste straw and the like sorted by the swing sorting device 21 and the air blow sorting device 22.

The reservoir unit 16 is disposed on the right side of the threshing unit 4. The reservoir unit 16 includes a reservoir tank (grain tank) 24 and a discharge device 25. The reservoir tank 24 reserves the grains conveyed from the sorting unit 5. The discharge device 25 is composed of an auger or the like at the discharge position set at arbitrary position and discharges grains reserved in the reservoir tank 24 to the discharge site or a carrier vehicle parked at the discharge site.

The waste straw processing unit 6 is disposed behind the threshing unit 4. The waste straw processing unit 6 includes a waste straw conveying device (not shown) and a waste straw cutting device (not shown). The waste straw conveying device conveys the waste straws conveyed from the feed chain 18 of the threshing unit 4 to the waste straw cutting device. The waste straw cutting device cuts the waste straws conveyed by the waste straw conveying device, and discharges the cut waste straws to the outside of the machine.

The power unit 8 is provided above the traveling unit 14 and in front of the reservoir unit 16. The power unit 8 includes an engine 27 that generates rotational power. The power unit 8 transmits the rotational power generated by the engine 27 to the traveling unit 14, the reaping unit 15, the reservoir unit 16, the threshing unit 4, the sorting unit 5, and the waste straw processing unit 6.

The steering unit 9 is disposed above the power unit 8. Around a driver's seat on which the operator sits, the steering unit 9 includes, as operation tools for steering the travel of the combine 1, a steering wheel for ordering a turn of the machine body of the combine 1, a main shift lever and sub-shift lever for ordering change of the advancing speed or the retreating speed of the combine 1. The manual traveling of the combine 1 is performed by the traveling unit 14 that accepts operations of the steering wheel, the main shift lever, and the sub-shift lever of the steering unit 9. The steering unit 9 also includes a machinery to operate reaping work by the reaping unit 15, threshing work by the threshing unit 4, discharging work by the discharge device 25 in the reservoir unit 16, etc.

The positioning unit 13 acquires the combine 1's own vehicle position using a satellite positioning system such as GPS. For example, the positioning unit 13 receives a positioning signal from a positioning satellite via a positioning antenna, and acquires position information of the positioning unit 13, i.e., the combine 1's own position, based on the positioning signal.

The communication unit 17 (see FIG. 1) is a communication interface that connects the combine 1 to the communication network N1 in a wired or wireless manner, and conducts data communication with an external device such as the operation terminal 3 via the communication network N1 in accordance with a predetermined communication protocol.

The storage unit 12 is a non-volatile storage unit such as an HDD and an SSD that stores various pieces of information. The storage unit 12 stores a control program such as an autonomous travel program for causing the controller 11 to execute an autonomous travel process described below (see FIG. 8). For example, the autonomous travel program is non-temporarily recorded in a computer-readable recording medium such as a flash ROM, an EEPROM, a CD or a DVD, read by a predetermined reading device (not shown), and stored in the storage unit 12. The autonomous travel program may be downloaded from a server (not shown) via the communication network N1 to the combine 1 and stored in the storage unit 12. In addition, the storage unit 12 stores various pieces of setting information obtained from the operation terminal 3.

The controller 11 has control devices such as a CPU, a ROM, and a RAM. The CPU is a processor that executes various types of arithmetic processes. The ROM is a non-volatile storage unit in which a control program such as a BIOS and an OS for causing the CPU to execute the various arithmetic processes are previously stored. The RAM is a volatile or non-volatile storage unit that stores various pieces of information and is used as a temporary storage memory for the various processes executed by the CPU. The controller 11 controls the combine 1 by causing the CPU to execute the various types of control programs that are in advance stored in the ROM or the storage unit 12.

Specifically, as shown in FIG. 1, the controller 11 includes various processing units, such as a traveling processor 111, a setting processor 112, and a reception processor 113. The controller 11 functions as the various processing units by causing the CPU to execute the various processes according to the autonomous travel program. Some or all of the processors may be composed of an electronic circuit. The autonomous travel program may be a program for causing a plurality of processors to function as the processing units.

The traveling processor 111 causes the combine 1 to travel autonomously according to the target route set for the field. Specifically, the traveling processor 111 obtains various pieces of setting information set for the field from the operation terminal 3. For example, the traveling processor 111 acquires the combine 1's own position from the positioning unit 13 during the reaping work in the field F (see FIG. 3), and controls the power unit 8, the traveling unit 14, and the reaping unit 15 such that the combine 1 performs the autonomous travel and the reaping work along the target route on the basis of the vehicle l's own position and the target route.

The setting processor 112 controls the speed of the combine 1 during autonomous travel. Specifically, the setting processor 112 controls the vehicle speed of the combine 1 on each of the straight advancing route and the turning route included in the target route based on preset vehicle speeds (e.g., the straight advancing vehicle speed, the turning vehicle speed, and the retreating vehicle speed shown in FIG. 5). For example, in the case where the vehicle speed of the combine 1 is set to the speed shown in FIG. 5, the setting processor 112 controls the vehicle speed of the combine 1 which travels autonomously as follows.

Specifically, when the combine 1 travels straight ahead along the straight advancing route in the work area in the field F, the setting processor 112 sets the vehicle speed of the combine 1 to "100%". When the combine 1 travels straight ahead along the straight advancing route in a non-work area in the field F, the setting processor 112 sets the vehicle speed of the combine 1 to "75%". When the combine 1 travels by turning along the turning route, the setting processor 112 sets the vehicle speed of the combine 1 to "50%". When the combine 1 travels by retreating, the setting processor 112 sets the vehicle speed of the combine 1 to "5%".

Here, the setting processor 112 may change the preset vehicle speed based on the distance of the route. Specifically, the setting processor 112 changes the preset straight advancing vehicle speed to a speed slower than the straight advancing vehicle speed if the distance of the straight advancing route following the turning route is less than a predetermined distance. For example, in the example shown in FIG. 6, when the combine 1 travels the straight advancing route r4 following the turning route r3, the setting processor 112 sets the preset straight advancing vehicle speed "75%" in the non-work area to less than 75% if the distance L1 of the straight advancing route r4 is less than the predetermined distance. Specifically, for the straight advancing route r4 the setting processor 112 sets the same speed "50%" as the turning vehicle speed "50%" corresponding to the turning route r3 just before the straight advancing route r4.

This allows the traveling processor 111 to cause the combine 1 to travel at a speed slower than the preset speed ("75%") on the straight advancing route r4. For example, in the straight advancing route r4, the traveling processor 111 causes the combine 1 to travel at the turning vehicle speed ("50%") of the turning route r3.

If the setting processor 112 sets the vehicle speed of the straight advancing route r4 to the turning vehicle speed, the traveling processor 111 causes the combine 1 to travel at an identical speed (turning vehicle speed "50%") on the turning route r3, the straight advancing route r4, and the turning route r5. This allows the acceleration and deceleration of the combine 1 to be reduced just before and just after the straight advancing route r4 between the turning routes r3 and r5.

In contrast, if the distance of the straight advancing route following the turning route is longer than the predetermined distance, the setting processor 112 maintains the preset straight advancing vehicle speed. For example, in an example shown in FIG. 7, when the combine 1 travels along the straight advancing route r4 following the turning route r3, the setting processor 112 maintains the preset straight advancing vehicle speed "75%" in the non-work area if the distance L1 of the straight advancing route r4 is longer than the predetermined distance.

This allows the traveling processor 111 to cause the combine 1 to travel at the preset vehicle speed ("75%") on the straight advancing route r4. If the distance of the straight advancing route r4 is long, it is possible to prevent work efficiency from being decreased by causing the combine 1 to travel at a speed based on the preset vehicle speed.

The reception processor 113 accepts operations from the operator during the autonomous travel. For example, when the operator getting on the combine 1 operates the main shift lever while the combine 1 is traveling autonomously, the reception processor 113 accepts the operation. Upon the reception processor 113 accepts the operation of the main shift lever, the setting processor 112 changes the vehicle speed of the combine 1 based on the preset vehicle speed (see FIG. 5).

In the example shown in FIG. 6, the operator can operate the main shift lever so as to change the vehicle speed of the combine 1 within the range of the turning vehicle speed "50%" that is set for the turning route r3, the straight advancing route r4, and the turning route r5. For example, if the maximum speed is set at 4 km/h for the straight advancing vehicle speed ("100%"), the operator can operate the main speed lever so as to change the vehicle speed at the turning route r3, the straight advancing route r4, and the turning route r5 within "2 km/h" (upper limit speed).

As described above, if the distance L1 of the straight advancing route following the turning route is less than the predetermined distance, the traveling processor 111 causes the combine 1 to travel along the straight advancing route at a speed slower than the preset vehicle speed (straight advancing vehicle speed). If the distance L1 of the straight advancing route is less than the predetermined distance, the traveling processor 111 causes the combine 1 to travel along the straight advancing route at the vehicle speed corresponding to the turning route (turning vehicle speed).

The vehicle speed for each of the straight advancing route and the turning route may be set as a specific speed instead of a percentage, and the combine 1 may autonomously travel along the target route according to the set speed.

Autonomous Travel Process

An example of the autonomous travel process performed by the autonomous travel system 10 according to the first embodiment is described below with reference to FIG. 8.

The present disclosure can be understood as a disclosure of an autonomous travel method that executes one or more steps included in the aforementioned autonomous travel process. Furthermore, one or more steps included in the autonomous travel process explained herein may be omitted as appropriate. Note that each step in the autonomous travel process may be executed in a different order as long as the same working effect is obtained. Furthermore, although a case where the controller 11 executes each step in the autonomous travel process is described as an example, an autonomous travel method in which one or more processors execute each of steps in the autonomous travel process in a distributed manner is also considered as another embodiment.

Upon the operator inputs the work start instruction at the operation terminal 3 and the controller 11 obtains the work start instruction and setting information from the operation terminal 3, the controller 11 causes the combine 1 to initiate autonomous travel according to the target route (see FIG. 3) generated for the field F included in the setting information. For example, the controller 11 causes the combine 1 to perform the work (reaping work) in a work area in the field F while causing the combine 1 to travel autonomously along the target route. The controller 11 may be able to accept operation of the main shift lever by the operator getting on the combine 1. In this case, the controller 11 changes the vehicle speed of the combine 1 during the autonomous travel in response to the operator's operation. For example, in the case where the straight advancing speed is set to 100% and the turning vehicle speed is set to 50% in the aforementioned setting information (see FIG. 5), the controller 11 sets the vehicle speed of the combine 1 to 100% of the speed (upper limit speed) when the operator shifts the main shift lever to the maximum speed position as the combine 1 travels along the straight advancing route, as well as the controller 11 sets the vehicle speed of the combine 1 to 50% of the upper limit speed when the operator shifts the main shift lever to the maximum speed position as the combine 1 travels along the turning route.

Figure 8:
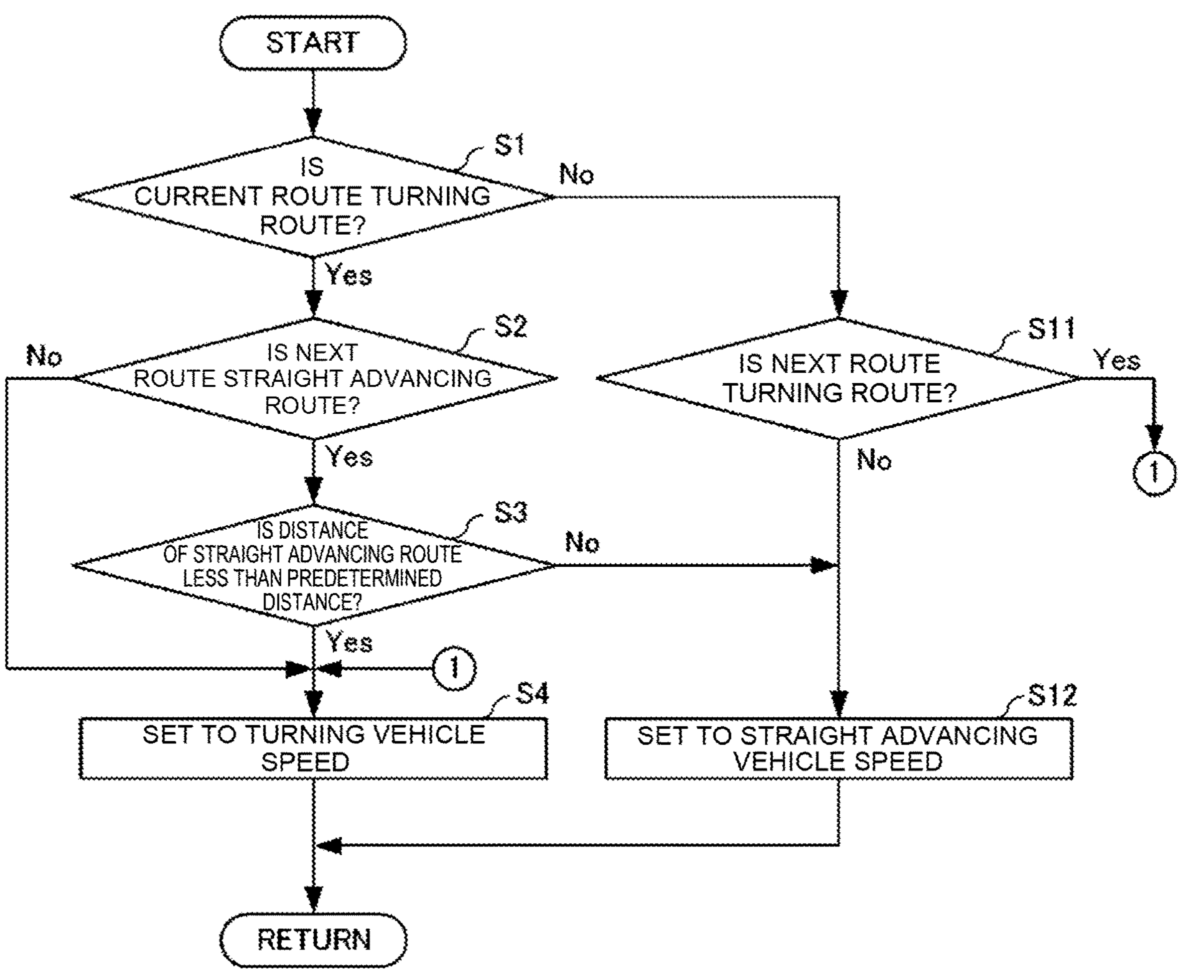
FIG. 8 is a flowchart illustrating an example of a procedure of an autonomous travel process executed by the autonomous travel system according to the first embodiment of the present disclosure.

The controller 11 controls the vehicle speed of the combine 1 by executing the process shown in FIG. 8 when the combine 1 travels autonomously along the target route.

First, in step S1, the controller 11 determines whether or not the travel route along which the combine 1 is currently traveling is a turning route. If the controller 11 determines that the travel route along which the combine 1 is currently traveling is the turning route (S1: Yes), the controller 11 moves the process to step S2. On the other hand, if the controller 11 determines that the travel route along which the combine 1 is currently traveling is not the turning route, i.e., a straight advancing route (S1: No), the controller 11 moves the process to step S11.

In step S2, the controller 11 determines whether or not the next route following the turning route is a straight advancing route. If the controller 11 determines that the next route following the turning route is the straight advancing route (S2: Yes), the controller 11 moves the process to step S3. On the other hand, if the controller 11 determines that the next route following the turning route is not the straight advancing route, i.e., the next route following the turning route is a turning route (S2: No), the controller 11 moves the process to step S4.

In step S3, the controller 11 determines whether or not a distance of the straight advancing route following the turning route is less than a predetermined distance. If the controller 11 determines that the distance of the straight advancing route following the turning route is less than the predetermined distance (S3: Yes), the controller 11 moves the process to step S4. For example, as shown in FIG. 6, if the controller 11 determines that the distance L1 of the straight advancing route r4 following the turning route r3 is less than the predetermined distance (S3: Yes), the controller 11 moves the process to step S4.

Figure 7:
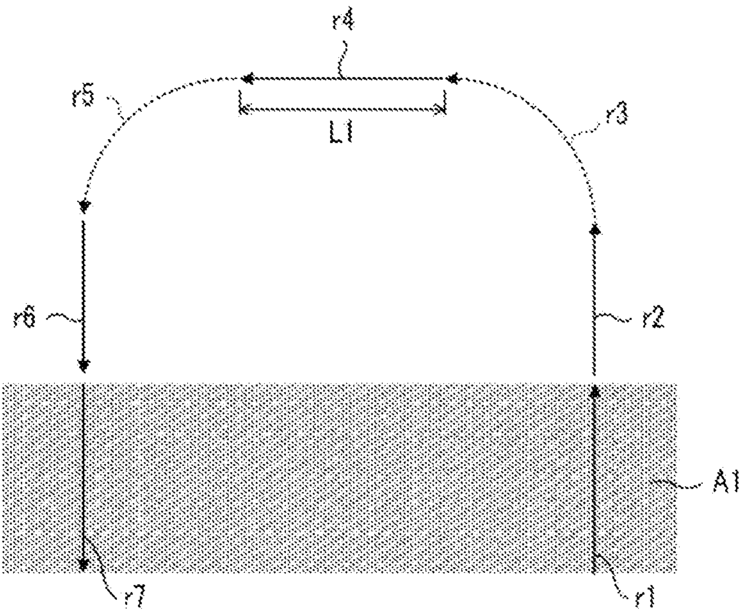
FIG. 7 is a diagram illustrating an example of a travel method of the combine on the target route according to the first embodiment of the present disclosure.

On the other hand, if the controller 11 determines that the distance of the straight advancing route following the turning route is not less than the predetermined distance (S3: No), the controller 11 moves the process to step S12. For example, as shown in FIG. 7, if the controller 11 determines that the distance L1 of the straight advancing route r4 following the turning route r3 is not less than the predetermined distance (S3: No), the controller 11 moves the process to step S12.

In step S4, the controller 11 sets the vehicle speed of the combine 1 corresponding to the straight advancing route following the turning route to the turning speed. For example, in the example shown in FIG. 6, the controller 11 sets the vehicle speed of the combine 1 on the straight advancing route r4 following the turning route r3 to the turning vehicle speed "50%" corresponding to the turning route r3.

In step S12, the controller 11 sets the vehicle speed of the combine 1 corresponding to the straight advancing route following the turning route to the straight advancing vehicle speed. For example, in the example shown in FIG. 7, the controller 11 sets (maintains) the vehicle speed of the combine 1 on the straight advancing route r4 following the turning route r3 to the straight advancing vehicle speed "75%".

If the travel route along which the combine 1 is currently traveling is a straight advancing route (S1: No), in step S11, the controller 11 determines whether or not the next route following the straight advancing route is a turning route. If the controller 11 determines that the next route following the straight advancing route is the turning route (S11: Yes), the controller 11 moves the process to step S4 and sets the vehicle speed of the combine 1 to the turning speed "50%". On the other hand, if the controller 11 determines that the next route following the straight advancing route is a straight advancing route (S11: No), the controller 11 moves the process to step S12 and sets (maintains) the vehicle speed of the combine 1 at the straight advancing vehicle speed.

After steps S4 and S12, the controller 11 returns the process to step S1 and repeats the abovementioned processes. The controller 11 controls the vehicle speed of the combine 1 by repeatedly executing the abovementioned processes while the combine 1 travels autonomously from the work start position S to the work end position G along the target route in the field F.

As described above, the autonomous travel system 10 according to the first embodiment changes the vehicle speed that is preset for the straight advancing route (straight advancing vehicle speed) to a speed less than the straight advancing vehicle speed if the distance of the straight advancing route following the turning route is less than the predetermined distance. For example, the autonomous travel system 10 changes the vehicle speed of the combine 1 at the straight advancing route to a preset vehicle speed for the turning route (turning vehicle speed). That is, the autonomous travel system 10 limits the vehicle speed on the straight advancing route to a speed whose upper limit is the turning vehicle speed.

This allows the occurrence of unnecessary acceleration and deceleration of the combine 1 due to differences in the set vehicle speed to be reduced if a straight advancing route with a short distance is generated between turning routes (see FIG. 6), for example. This makes it possible to prevent the combine 1 from behaving unsteadily and prevent the operator getting on the combine 1 from becoming uncomfortable. If the distance of the straight advancing route generated between the turning routes is long, the set vehicle speed (straight advancing vehicle speed) is applied to the vehicle speed of combine 1 at the straight advancing route, thereby preventing the combine 1 from decelerating unnecessarily as resulting in decreasing of the work efficiency.

The present disclosure is not limited to the above described first embodiment. Other embodiments of the present disclosure will be described below. In the following embodiment, duplicated explanation is omitted for the same configurations as the first embodiment mentioned above.

Second Embodiment

In the embodiment 1 described above, in the straight advancing route following the turning route, the controller 11 causes the combine 1 to travel at a straight advancing vehicle speed if the distance of the straight advancing route is not less than the predetermined distance, while the controller 11 changes (decelerates) the straight advancing vehicle speed if the distance of the straight advancing route is less than the predetermined distance. For example, the controller 11 causes the combine 1 to travel at a turning vehicle speed along a straight advancing route if the distance of the straight advancing route is less than the predetermined distance.

In contrast, in the second embodiment, the controller 11 causes the combine 1 to travel along the turning route following the straight advancing route at the turning vehicle speed when the distance of the turning route is not less than the predetermined distance, while the controller 11 changes the turning vehicle speed and causes the combine 1 to travel at the changed turning vehicle speed when the distance of the turning route is less than the predetermined distance. This configuration is described in detail with reference to FIG. 9.

Figure 9:
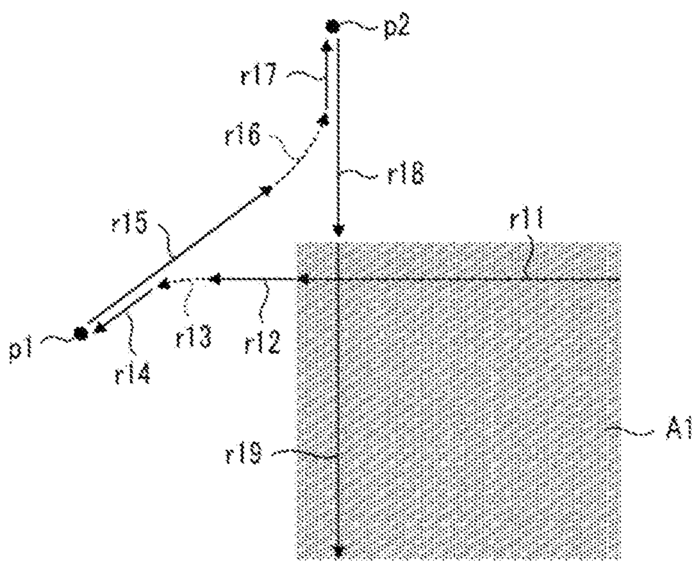
FIG. 9 is a diagram illustrating an example of a travel method of the combine on the target route according to a second embodiment of the present disclosure.

FIG. 9 shows an example of a travel method of the combine 1 on the target route. The target route shown in FIG. 9 includes a straight advancing route r11 within a work area A1, a straight advancing route r12 outside the work area A1 (e.g., headland area), a turning route r13, a straight advancing route r14, a straight advancing route r15 in a retreating direction, a turning route r16 in the retreating direction, a straight advancing route r17 and a straight advancing routes r18 in the retreating direction, and a straight advancing route r19 within the work area A1. In the target route shown in FIG. 9, the combine 1 travels along the straight advancing route r11 and the straight advancing route r12 at the straight advancing vehicle speed, travels along the turning route r13 at the turning vehicle speed, travels along the straight advancing route r14 at the straight advancing vehicle speed, and stops at a position p1. Then, the combine 1 switches the route to the retreating direction, travels along the straight advancing route r15 at a straight retreating vehicle speed, travels along the turning route r16 at a turning retreating vehicle speed, travels along the straight advancing route r17 at the straight retreating vehicle speed, and stops at a position p2. Then, the combine 1 switches the route to the advancing direction and travels along the straight advancing route r18 and the straight advancing route r19 at the straight advancing vehicle speed.

Here, for example, if the distance of the turning route r13 generated between the straight advancing route r12 and the straight advancing route r14 is short, the combine 1 decelerates after transiting from the straight advancing route r12 to the turning route r13 and accelerates on the straight advancing route r14 immediately. Similar to the example shown in FIG. 6, acceleration and deceleration occur in a short time period before and after traveling along the turning route r13, so that it results in problems such as unstable behavior of the work vehicle and poor riding comfort for the operator getting on the work vehicle.

Thus, the setting processor 112 changes the preset turning vehicle speed to a speed faster than the turning vehicle speed if the distance of the turning route following the straight advancing route is less than the predetermined distance. For example, in the example shown in FIG. 9, when the combine 1 travels the turning route r13 following the straight advancing route r12, the setting processor 112 sets the preset turning vehicle speed "50%" to a speed more than 50% if the distance of the turning route r13 is less than the predetermined distance. Specifically, for the turning route r13 the setting processor 112 sets the same speed "75%" as the straight advancing vehicle speed "75%" in the non-work area (see FIG. 5) corresponding to the straight advancing route r12 just before the turning route r13.

This allows the traveling processor 111 to cause the combine 1 to travel at a speed faster than the preset speed ("50%") on the turning route r13. For example, in the turning route r13, the traveling processor 111 causes the combine 1 to travel at the turning vehicle speed ("75%") of the straight advancing route r12.

If the setting processor 112 sets the vehicle speed of the turning route r13 to the straight advancing vehicle speed, the traveling processor 111 causes the combine 1 to travel at an identical speed (turning vehicle speed "75%") on the straight advancing route r12, the turning route r13, and the straight advancing route r14. This allows the acceleration and deceleration of the combine 1 to be reduced.

In contrast, if the distance of the turning route following the straight advancing route is not less than the predetermined distance, the setting processor 112 maintains the preset turning vehicle speed. For example, when the combine 1 travels the turning route r13 following the straight advancing route r12, the setting processor 112 maintains the preset turning vehicle speed "50%" if the distance of the turning route r13 is not less than the predetermined distance.

This allows the traveling processor 111 to cause the combine 1 to travel at the preset vehicle speed ("50%") on the turning route r13. If the distance of the turning route r13 is long, the combine 1 can stably travel by turning by traveling at a speed based on the preset vehicle speed.

Figure 10:
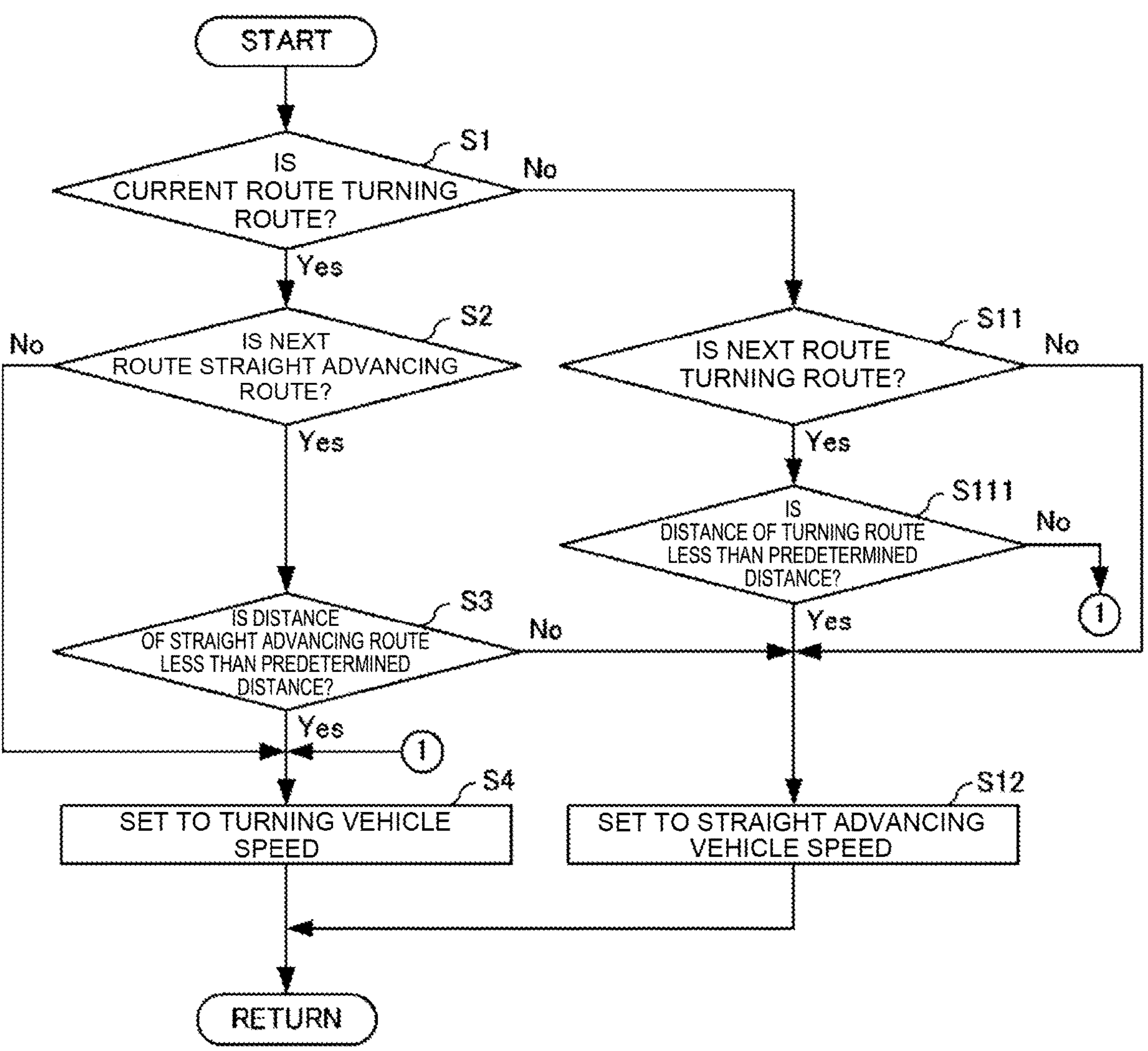
FIG. 10 is a flowchart illustrating another example of the procedure of the autonomous travel process executed by the autonomous travel system according to the second embodiment of the present disclosure.

FIG. 10 shows an example of the autonomous travel process performed by the autonomous travel system 10 according to the second embodiment. In the autonomous travel process shown in FIG. 10, the same steps as the autonomous travel process shown in FIG. 8 corresponding to the first embodiment are denoted by an identical step numeral, and duplicated explanation is omitted.

If the travel route along which the combine 1 is currently traveling is a straight advancing route (S1: No), in step S11, the controller 11 determines whether or not the next route following the straight advancing route is a turning route. If the controller 11 determines that the next route following the straight advancing route is the turning route (S11: Yes), the controller 11 moves the process to step S111. On the other hand, if the controller 11 determines that the next route following the straight advancing route is a straight advancing route (S11: No), the controller 11 moves the process to step S12 and sets (maintains) the vehicle speed of the combine 1 at the straight advancing vehicle speed.

In step S111, the controller 11 determines whether or not the distance of the turning route following the straight advancing route is less than a predetermined distance. If the controller 11 determines that the distance of the turning route following the straight advancing route is less than the predetermined distance (S111: Yes), the controller 11 moves the process to step S12. For example, as shown in FIG. 9, if the controller 11 determines that the distance of the turning route r13 following the straight advancing route r12 is less than the predetermined distance (S111: Yes), the controller 11 moves the process to step S12.

On the other hand, if the controller 11 determines that the distance of the turning route following the straight advancing route is not less than the predetermined distance (S111: No), the controller 11 moves the process to step S4. For example, as shown in FIG. 9, if the controller 11 determines that the distance of the turning route r13 following the straight advancing route r12 is not less than the predetermined distance (S111: No), the controller 11 moves the process to step S4.

In step S12, the controller 11 sets the vehicle speed of the combine 1 corresponding to the turning route following the straight advancing route to the straight advancing vehicle speed. For example, in the example shown in FIG. 9, the controller 11 sets the vehicle speed of the combine 1 on the turning route r13 to the turning vehicle speed "75%" corresponding to the straight advancing route r12 when the distance of the turning route r13 following the straight advancing route r12 is less than the predetermined distance (S111: Yes).

In contrast, in step S4, the controller 11 sets the vehicle speed of the combine 1 corresponding to the turning route following the straight advancing route to the turning vehicle speed. For example, in the example shown in FIG. 9, if the distance of the turning route r13 following the straight advancing route r12 is not less than the predetermined distance (S111: No), the controller 11 sets (maintains) the vehicle speed of the combine 1 on the turning route r13 to the turning speed "50%".

Although an example of a method of controlling the vehicle speed on the turning route r13 is described in the above description, the controller 11 may similarly control a vehicle speed on the turning route r16 along which the combine 1 travels by retreating. For example, in the case where the set vehicle speeds for each of the straight advancing route r15 and the turning route r16 (straight retreating vehicle speed and turning retreating vehicle speed) are different, if the distance of the turning route r16 is less than the predetermined distance, the controller 11 causes the combine 1 to travel at the vehicle speed on the turning route r16 identical to the straight advancing vehicle speed on the straight advancing route r15 (straight retreating vehicle speed).

In this way, in the second embodiment, the controller 11 causes the combine 1 to travel at the turning vehicle speed on the straight advancing route if the distance of the straight advancing route following the turning route is less than a predetermined distance (see FIG. 6), as well as the controller 11 causes the combine 1 to travel at the straight advancing vehicle speed on the turning route if the distance of the turning route following the straight advancing route is less than the predetermined distance (see FIG. 9).

The predetermined distance (first threshold value) corresponding to the distance of the straight advancing route following the turning route may be set to be different from the predetermined distance (second threshold value) corresponding to the distance of the turning route following the straight advancing route. For example, the controller 11 may set the second threshold value to a value smaller than the first threshold value to ensure stability during the turning travel.

As explained above, the autonomous travel system 10 according to the second embodiment changes the vehicle speed that is preset for the turning route (turning vehicle speed) to a speed faster than the turning vehicle speed if the distance of the turning route following the straight advancing route is less than the predetermined distance. For example, the autonomous travel system 10 changes the vehicle speed of the combine 1 on the turning route to the vehicle speed that is preset for the straight advancing route (straight advancing vehicle speed). That is, the autonomous travel system 10 limits the vehicle speed on the turning route to a speed whose upper limit is the straight advancing vehicle speed.

This allows the occurrence of unnecessary acceleration and deceleration of the combine 1 due to differences in the set vehicle speed to be reduced if a turning route with a short distance is generated between straight advancing routes, for example. This makes it possible to prevent the combine 1 from behaving unsteadily and prevent the operator getting on the combine 1 from becoming uncomfortable. If the length of the turning route generated between the straight advancing routes is long, the set vehicle speed (turning vehicle speed) is applied to the vehicle speed of the combine 1 on the straight advancing route, thereby preventing the combine 1 from accelerating unnecessarily as resulting in reduction of stability of the turning travel.

Third Embodiment

Generally, the smaller the turning radius of the combine 1 is, the lower the traveling stability is, and the larger the turning radius is, the higher the traveling stability is. In this regard, in the second embodiment mentioned above, if the vehicle speed of the combine 1 on a turning route with a small turning radius is set to the straight advancing vehicle speed, the stability of turning travel may be reduced.

Therefore, in the third embodiment, the controller 11 may be configured to cause the combine 1 to travel at a speed faster than the turning vehicle speed on the turning route if the distance of the turning route following the straight advancing route is less than a predetermined distance as well as the turning radius of the turning route is not less than a threshold value (predetermined radius), and configured to cause the combine 1 to travel at the turning vehicle speed on the turning route if the distance of the turning route is less than the predetermined distance as well as the turning radius of the turning route is less than the threshold value.

Figure 11:
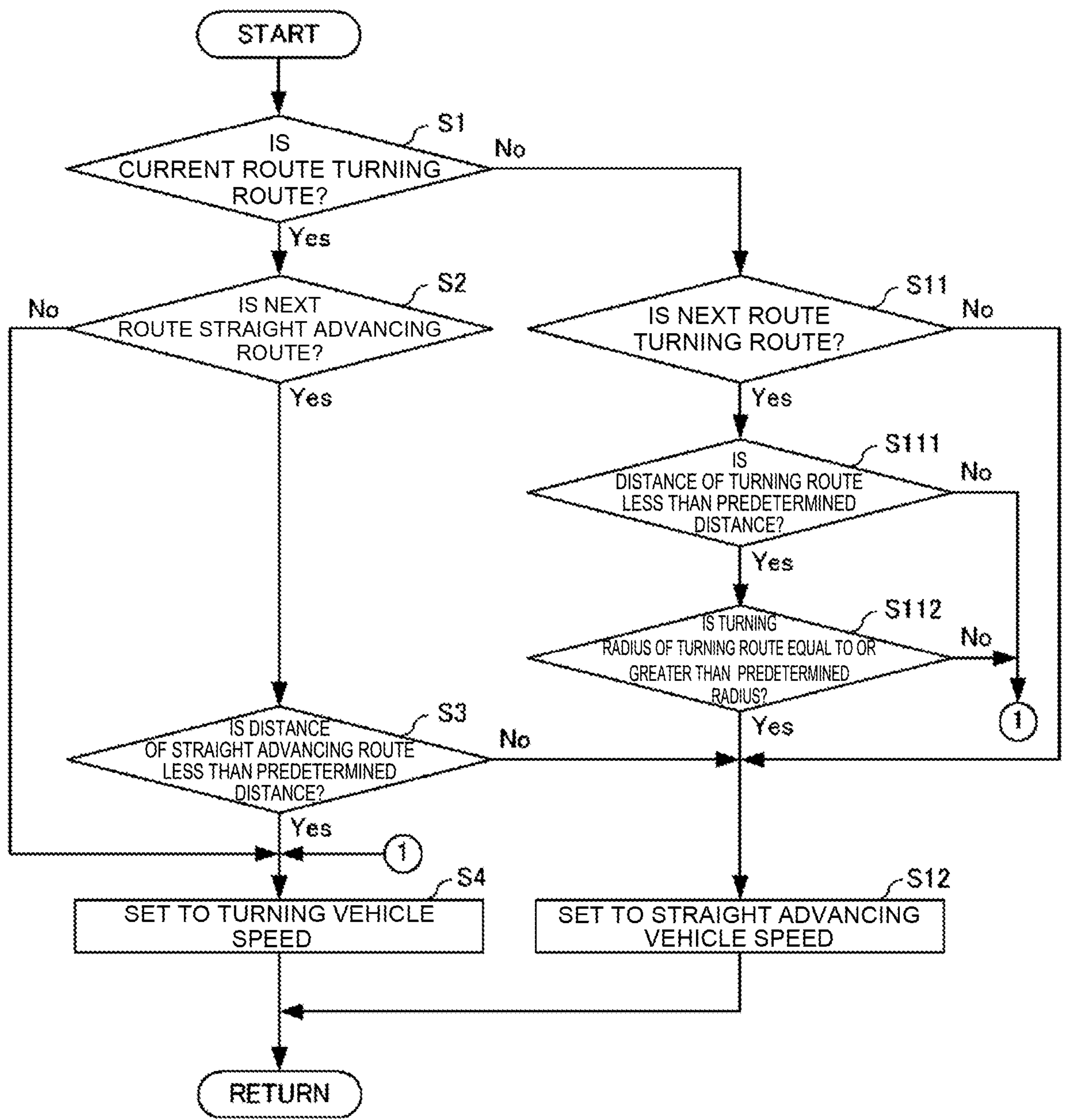
FIG. 11 is a flowchart illustrating another example of the procedure of the autonomous travel process executed by the autonomous travel system according to a third embodiment of the present disclosure.

FIG. 11 shows an example of the autonomous travel process performed by the autonomous travel system 10 according to the third embodiment. In the autonomous travel process shown in FIG. 11, the same steps as the autonomous travel process shown in FIGS. 8 and 10 corresponding to the first and second embodiments are denoted by an identical step numeral, and duplicated explanation is omitted.

If the travel route along which the combine 1 is currently traveling is a straight advancing route (S1: No), in step S11, the controller 11 determines whether or not the next route following the straight advancing route is a turning route. If the controller 11 determines that the next route following the straight advancing route is the turning route (S11: Yes), the controller 11 moves the process to step S111. On the other hand, if the controller 11 determines that the next route following the straight advancing route is a straight advancing route (S11: No), the controller 11 moves the process to step S12 and sets (maintains) the vehicle speed of the combine 1 at the straight advancing vehicle speed.

In step S111, the controller 11 determines whether or not the distance of the turning route following the straight advancing route is less than a predetermined distance. If the controller 11 determines that the distance of the turning route following the straight advancing route is less than the predetermined distance (S111: Yes), the controller 11 moves the process to step S112. For example, as shown in FIG. 9, if the controller 11 determines that the distance of the turning route r13 following the straight advancing route r12 is less than the predetermined distance (S111: Yes), the controller 11 moves the process to step S112.

On the other hand, if the controller 11 determines that the distance of the turning route following the straight advancing route is not less than the predetermined distance (S111: No), the controller 11 moves the process to step S4. For example, as shown in FIG. 9, if the controller 11 determines that the distance of the turning route r13 following the straight advancing route r12 is not less than the predetermined distance (S111: No), the controller 11 moves the process to step S4.

In step S112, the controller 11 determines whether or not a turning radius of the turning route following the straight advancing route is not less than a predetermined radius. If the controller 11 determines that the turning radius of the turning route following the straight advancing route is not less than the predetermined radius (S112: Yes), the controller 11 moves the process to step S12. For example, as shown in FIG. 9, if the controller 11 determines that the turning radius of the turning route r13 following the straight advancing route r12 is not less than the predetermined radius (S112: Yes), the controller 11 moves the process to step S12.

On the other hand, if the controller 11 determines that the turning radius of the turning route following the straight advancing route is less than the predetermined radius (S112: No), the controller 11 moves the process to step S4. For example, as shown in FIG. 9, if the controller 11 determines that the turning radius of the turning route r13 following the straight advancing route r12 is less than the predetermined radius (S112: No), the controller 11 moves the process to step S4.

In step S12, the controller 11 sets the vehicle speed of the combine 1 corresponding to the turning route following the straight advancing route to the straight advancing vehicle speed. For example, in the example shown in FIG. 9, the controller 11 sets the vehicle speed of the combine 1 on the turning route r13 to the turning vehicle speed "75%" corresponding to the straight advancing route r12 if the distance of the turning route r13 following the straight advancing route r12 is less than the predetermined distance (S111: Yes) as well as the turning radius of the turning route r13 is not less than the predetermined radius (S112: Yes).

In contrast, in step S4, the controller 11 sets the vehicle speed of the combine 1 corresponding to the turning route following the straight advancing route to the turning vehicle speed. For example, in the example shown in FIG. 9, the controller 11 sets (maintains) the vehicle speed of the combine 1 on the turning route r13 to the turning speed "50%" if the distance of the turning route r13 following the straight advancing route r12 is not less than the predetermined distance (S111: No). Furthermore, for example, in the example shown in FIG. 9, the controller 11 sets (maintains) the vehicle speed of the combine 1 on the turning route r13 to the turning vehicle speed "50%" if the distance of the turning route r13 following the straight advancing route r12 is less than the predetermined distance (S111: Yes) as well as the turning radius of the turning route r13 is less than the predetermined radius (S112: No).

In this way, in the third embodiment, the controller 11 causes the combine 1 to travel at the turning vehicle speed if the distance of the straight advancing route following the turning route is less than the predetermined distance (see FIG. 6), and causes the combine 1 to travel at the straight advancing vehicle speed if the distance of the turning route following the straight advancing route is less than the predetermined distance as well as the turning radius of the turning route is not less than the predetermined radius (see FIG. 9). Even if the distance of the turning route following the straight advancing route is less than the predetermined distance, if the turning radius of the turning route is less than the predetermined radius (see FIG. 9), the controller 11 causes the combine 1 to travel at the turning vehicle speed. The controller 11 may control the vehicle speed of the combine 1 such that the larger the turning radius of the turning route following the straight advancing route is, the greater the vehicle speed of the combine 1 on the turning route following the straight advancing route within the upper limit vehicle speed (straight advancing vehicle speed) is, and the smaller the turning radius of the turning route following the straight advancing route is, the smaller the vehicle speed of the combine 1 on the turning route is.

The configuration of the third embodiment allows the occurrence of unnecessary acceleration and deceleration of the combine 1 due to differences in the set vehicle speed to be reduced if a turning route with a short distance and a small turning radius is generated between straight advancing routes, for example. This makes it possible to prevent the combine 1 from behaving unsteadily and prevent the operator getting on the combine 1 from becoming uncomfortable. If the distance of the turning route generated between the straight advancing routes is long, or if the turning radius of the turning route is small, the set vehicle speed (turning vehicle speed) is applied to the vehicle speed of the combine 1 on the turning route, thereby preventing the combine 1 from accelerating unnecessarily as resulting in reduction of stability of the turning travel.

In the third embodiment, the predetermined radius may be set according to a preset turning vehicle speed. For example, the controller 11 sets the predetermined radius such that the smaller the preset turning vehicle speed is, the smaller the predetermined radius is, and the greater the preset turning vehicle speed is, the larger the predetermined radius is. This allows the stability of the turning travel in the turning route to be ensured.

As shown in each of the embodiments mentioned above, an autonomous travel system 10 according to the present disclosure includes: a configuration, on a second route in a target route including a first route for which a first vehicle speed is preset and the second route following the first route for which a second vehicle speed different from the first vehicle speed is preset, to cause a combine 1 to travel at the second vehicle speed if a distance of the second route is not less than a predetermined distance; and to change the second vehicle speed to cause the work vehicle to travel at the changed second vehicle speed if the distance of the second route is less than the predetermined distance.

Specifically, if the first route is a turning route, the second route is a straight advancing route, and the first vehicle speed (turning vehicle speed) is set to a speed slower than the second vehicle speed (straight advancing vehicle speed), the autonomous travel system 10 causes the combine 1 to travel on the turning route and the straight advancing route at the first vehicle speed (turning vehicle speed) (corresponding to the first embodiment).

If the first route is a straight advancing route, the second route is a turning route, and the first vehicle speed (straight advancing vehicle speed) is set to a speed faster than the second vehicle speed (turning vehicle speed), the autonomous travel system 10 causes the combine 1 to travel on the turning route and the straight advancing route at the first vehicle speed (straight advancing vehicle speed) ((corresponding to the second and third embodiments).

If the distance of the turning route is less than the predetermined distance as well as the turning radius of the turning route is not less than a threshold value (predetermined radius), the autonomous travel system 10 causes the combine 1 to travel on the turning route at the first vehicle speed (straight advancing vehicle speed), and if the distance of the turning route is less than the predetermined distance as well as the turning radius of the turning route is less than the threshold value, the autonomous travel system causes the combine 1 on the turning route at the second vehicle speed (turning vehicle speed) (corresponding to the third embodiment).

In each of the embodiments, the autonomous travel system 10 may change the second vehicle speed to a speed corresponding to the distance of the second route to cause the combine 1 to travel at the changed vehicle speed if the distance of the second route is less than the predetermined distance. For example, in the example shown in FIG. 6, if the distance L1 of the straight advancing route r4 is less than the predetermined distance, the controller 11 sets the vehicle speed such that the longer the distance L1 is, the greater the vehicle speed is ("75%" of the straight advancing route speed), and the shorter the distance L1 is, the smaller the vehicle speed is ("50%" of the turning speed). In the example shown in FIG. 9, for example, if the distance of the turning route r13 is less than the predetermined distance, the controller 11 sets the vehicle speed such that the longer the distance is, the smaller the vehicle speed is ("50%" of the turning speed), and the shorter the distance is, the greater the vehicle speed is ("75%" of the straight advancing vehicle speed).

According to the configuration of each of the embodiments, it is possible to suppress the occurrence of acceleration and deceleration when the combine 1 travels along a plurality of routes on which vehicle speeds are preset differently.

As another embodiment, the operation control unit 31 of the operation terminal 3 may cause a work screen (not shown) to display a message indicating that the preset vehicle speed is changed. The operation control unit 31 may also output the message audibly. For example, in the example shown in FIG. 6, the operation control unit 31 may cause the work screen to display or audibly output a message indicating that the vehicle speed of the combine 1 on the straight advancing route r4 is changed to the turning speed.

As another embodiment, the operation control unit 31 of the operation terminal 3 may cause the work screen (not shown) to display the route in which the preset vehicle speed is changed in a display manner (color, line type, etc.) different from other routes. For example, in the example shown in FIG. 6, the operation control unit 31 may cause the work screen to display the straight advancing route r4 in a different color than the other routes.

As another embodiment, in the example shown in FIG. 6, if the vehicle speed preset for the turning route r3 is different from the vehicle speed preset for the turning route r5, the controller 11 may set the vehicle speed of the combine 1 on the straight advancing route r4 to the vehicle speed preset for the turning route r3, to the vehicle speed preset for the turning route r5, or to a vehicle speed between the vehicle speed preset for the turning route r3 and the vehicle speed preset for the turning route r5. The controller 11 may also set the vehicle speed of the combine 1 on the straight advancing route r4 so as to gradually approach the vehicle speed preset for the turning route r5.

In the above embodiments, the combine 1 is mentioned as an example of a work vehicle. However, the work vehicle of the present disclosure is not limited to the combine 1 and may be various types of work vehicles, such as a tractor, a rice transplanter, and a construction machinery.

APPENDICES

Appended below is a summary of the invention extracted from the embodiments described above. Each component and each processing function described in the following supplementary notes can be subjected to selection and freely combined.

Appendix 1

An autonomous travel method including: on a second route in a target route including a first route for which a first vehicle speed is preset and the second route following the first route for which a second vehicle speed different from the first vehicle speed is preset, causing a work vehicle to travel at the second vehicle speed if a distance of the second route is not less than a predetermined distance; and changing the second vehicle speed to cause the work vehicle to travel at the changed second vehicle speed if the distance of the second route is less than the predetermined distance.

Appendix 2

The autonomous travel method according to appendix 1 further including causing the work vehicle to travel on the second route at a speed slower than the second vehicle speed if the distance of the second route is less than the predetermined distance.

Appendix 3

The autonomous travel method according to appendix 1 or 2 further including causing the work vehicle to travel on the second route at the first vehicle speed slower than the second vehicle speed if the distance of the second route is less than the predetermined distance.

Appendix 4

The autonomous travel method according to any one of appendices 1 to 3, wherein the first route is a turning route, and the second route is a straight advancing route, and the first vehicle speed is set to a speed slower than the second vehicle speed, and the method further including causing the work vehicle to travel on the first route and the second route at the first vehicle speed.

Appendix 5

The autonomous travel method according to appendix 1 further including causing the work vehicle to travel on the second route at a speed faster than the second speed if the distance of the second route is less than the predetermined distance.

Appendix 6

The autonomous travel method according to appendix 1 or 5 further including causing the work vehicle to travel on the second route at the first vehicle speed faster than the second speed if the distance of the second route is less than the predetermined distance.

Appendix 7

The autonomous travel method according to appendix 5 or 6, wherein the first route is a straight advancing route, and the second route is a turning route, and the first vehicle speed is set to a speed faster than the second vehicle speed, and the method further including causing the work vehicle to travel on the first route and the second route at the first vehicle speed.

Appendix 8

The autonomous travel method according to any one of appendices 5 to 7, wherein the first route is a straight advancing route, and the second route is a turning route, and the first vehicle speed is set to a speed faster than the second vehicle speed, and the method further including: causing the work vehicle to travel on the second route at the speed faster than the second vehicle speed if the distance of the second route is less than the predetermined distance as well as a turning radius of the second route is not less than a threshold value; and causing the work vehicle to travel on the second route at the second vehicle speed if the distance of the second route is less than the predetermined distance as well as the turning radius of the second route is less than the threshold value.

Appendix 9

The autonomous travel method according to any one of appendices 1 to 8 further including changing the second vehicle speed to a speed according to the distance of the second route to cause the work vehicle to travel at the changed speed if the distance of the second route is less than the predetermined distance.

Appendix 10

The autonomous travel method according to any one of appendices 1 to 9, wherein the target route further includes a third route following the second route for which the first vehicle speed is preset, the method further including causing the work vehicle to travel on the first route, the second route, and the third route at the first vehicle speed if the distance of the second route is less than the predetermined distance.

REFERENCE SIGNS LIST

1 Combine
3 Operation terminal
10 Autonomous travel system
11 Controller
111 Traveling processor
112 Setting processor
113 Reception processor
31 Operation control unit
311 Setting processor
312 Output processor
A1 Work area
F Field
r1 Straight advancing route
r2 Straight advancing route
r3 Turning route (first route)
r4 Straight advancing route (second route)
r5 Turning route (third route)
r6 Straight advancing route
r7 Straight advancing route

The invention claimed is:

1. An autonomous travel method comprising:

on a second route in a target route along which a work vehicle travels, the target route including a first route for which a first vehicle speed is preset and the second route following the first route for which a second vehicle speed different from the first vehicle speed is preset:

causing the work vehicle to travel at the second vehicle speed based on a distance of the second route being greater than or equal to a predetermined distance, wherein a maximum speed position of an operation lever of the work vehicle corresponds to the second vehicle speed when the distance of the second route is greater than or equal to the predetermined distance; or changing the second vehicle speed to cause the work vehicle to travel at the changed second vehicle speed and changing the speed corresponding to the maximum speed position of the operation lever to the changed second vehicle speed based on the distance of the second route being less than the predetermined distance, wherein the first route is a turning route, and the second route is a straight route.

2. The autonomous travel method according to claim 1, further comprising causing the work vehicle to travel on the second route at a speed slower than the second vehicle speed based on the distance of the second route being less than the predetermined distance.

3. The autonomous travel method according to claim 2, wherein:

the first vehicle speed is set to a speed slower than the second vehicle speed, and the method further comprises causing the work vehicle to travel on each of the first route and the second route at the first vehicle speed.

4. The autonomous travel method according to claim 1, further comprising causing the work vehicle to travel on the second route at the first vehicle speed slower than the second vehicle speed based on the distance of the second route being less than the predetermined distance.

5. The autonomous travel method according to claim 1, further comprising changing the second vehicle speed to a speed based on the distance of the second route to cause the work vehicle to travel at the changed second vehicle speed based on the distance of the second route being less than the predetermined distance.

6. The autonomous travel method according to claim 1, wherein:

the target route further includes a third route following the second route for which the first vehicle speed is preset, and the method further comprises causing the work vehicle to travel on the first route, the second route, and the third route at the first vehicle speed based on the distance of the second route being less than the predetermined distance.

7. An autonomous travel system comprising:

a traveling processor configured to, on a second route in a target route along which a work vehicle travels, the target route including a first route for which a first vehicle speed is preset and the second route following the first route for which a second vehicle speed different from the first vehicle speed is preset:

cause the work vehicle to travel at the second vehicle speed based on a distance of the second route being greater than or equal to a predetermined distance, wherein a maximum speed position of an operation lever of the work vehicle corresponds to the second vehicle speed when the distance of the second route is greater than or equal to the predetermined distance; or change the second vehicle speed to cause the work vehicle to travel at the changed second vehicle speed and change the speed corresponding to the maximum speed position of the operation lever to the changed second vehicle speed based on the distance of the second route being less than the predetermined distance;

wherein the first route is a turning route, and the second route is a straight route.

8. An autonomous travel method for a work vehicle on a second route in a target route along which the work vehicle travels, the target route including a first route for which a first vehicle speed is preset and the second route following the first route for which a second vehicle speed different from the first vehicle speed is preset, the method comprising:

causing, if a distance of the second route is greater than or equal to a predetermined distance, the work vehicle to travel at the second vehicle speed, wherein a maximum speed position of an operation lever of the work vehicle corresponds to the second vehicle speed when the distance of the second route is greater than or equal to a predetermined distance;

changing, if the distance of the second route is less than the predetermined distance, the second vehicle speed to cause the work vehicle to travel at the changed second vehicle speed; and changing, if the distance of the second route is less than the predetermined distance, the speed corresponding to the maximum speed position of the operation lever to the changed second vehicle speed, wherein the first route is a straight route, and the second route is a turning route.

9. The autonomous travel method according to claim 8, further comprising causing the work vehicle to travel on the second route at the first vehicle speed faster than the second vehicle speed based on the distance of the second route being less than the predetermined distance.

10. The autonomous travel method according to claim 8, wherein:

the first vehicle speed is set to a speed faster than the second vehicle speed, and the method further comprises causing the work vehicle to travel on each of the first route and the second route at the first vehicle speed.

11. The autonomous travel method according to claim 8, wherein the first vehicle speed is set to a speed faster than the second vehicle speed, and the method further comprises:

causing the work vehicle to travel on the second route at the speed faster than the second vehicle speed based on the distance of the second route being less than the predetermined distance and based on a turning radius of the second route being greater than or equal to a threshold value; and causing the work vehicle to travel on the second route at the second vehicle speed based on the distance of the second route being less than the predetermined distance and based on the turning radius of the second route being less than the threshold value.

* * * * *